No. 681,012. Patented Aug. 20, 1901.
J. R. BABCOCK.
WHEELED PLOW OR CULTIVATOR.
(Application filed Feb. 21, 1901.)
(No Model.) 3 Sheets—Sheet 1.
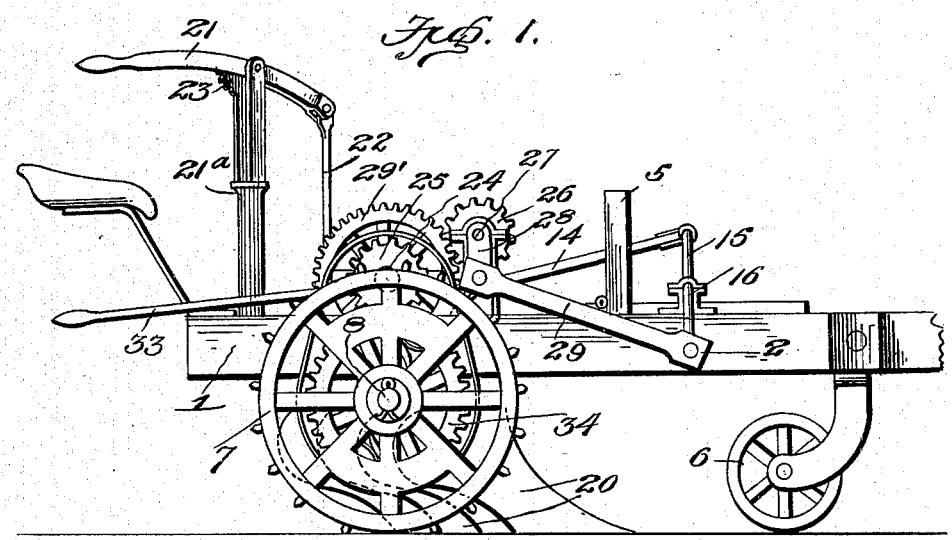
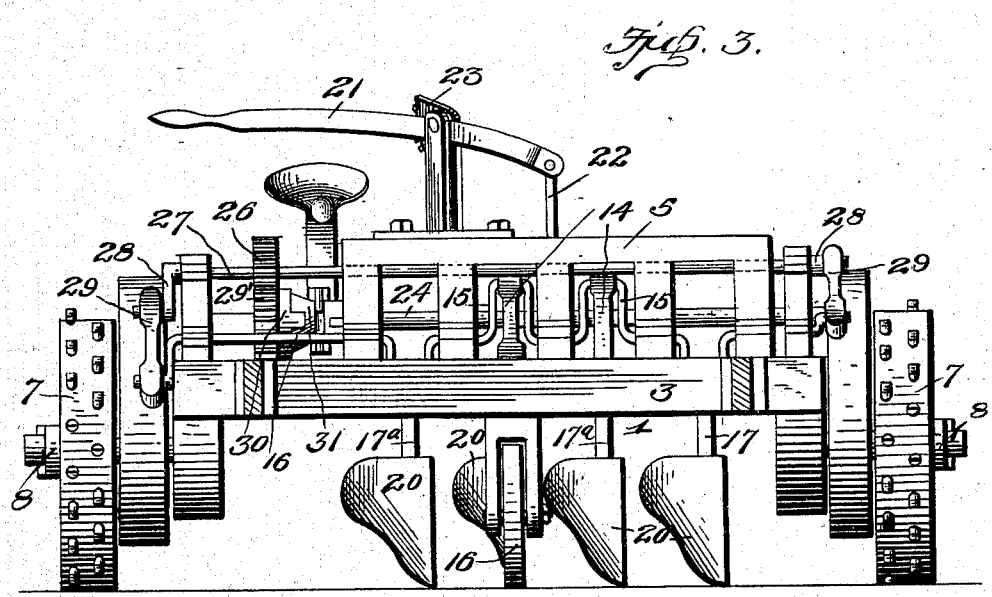

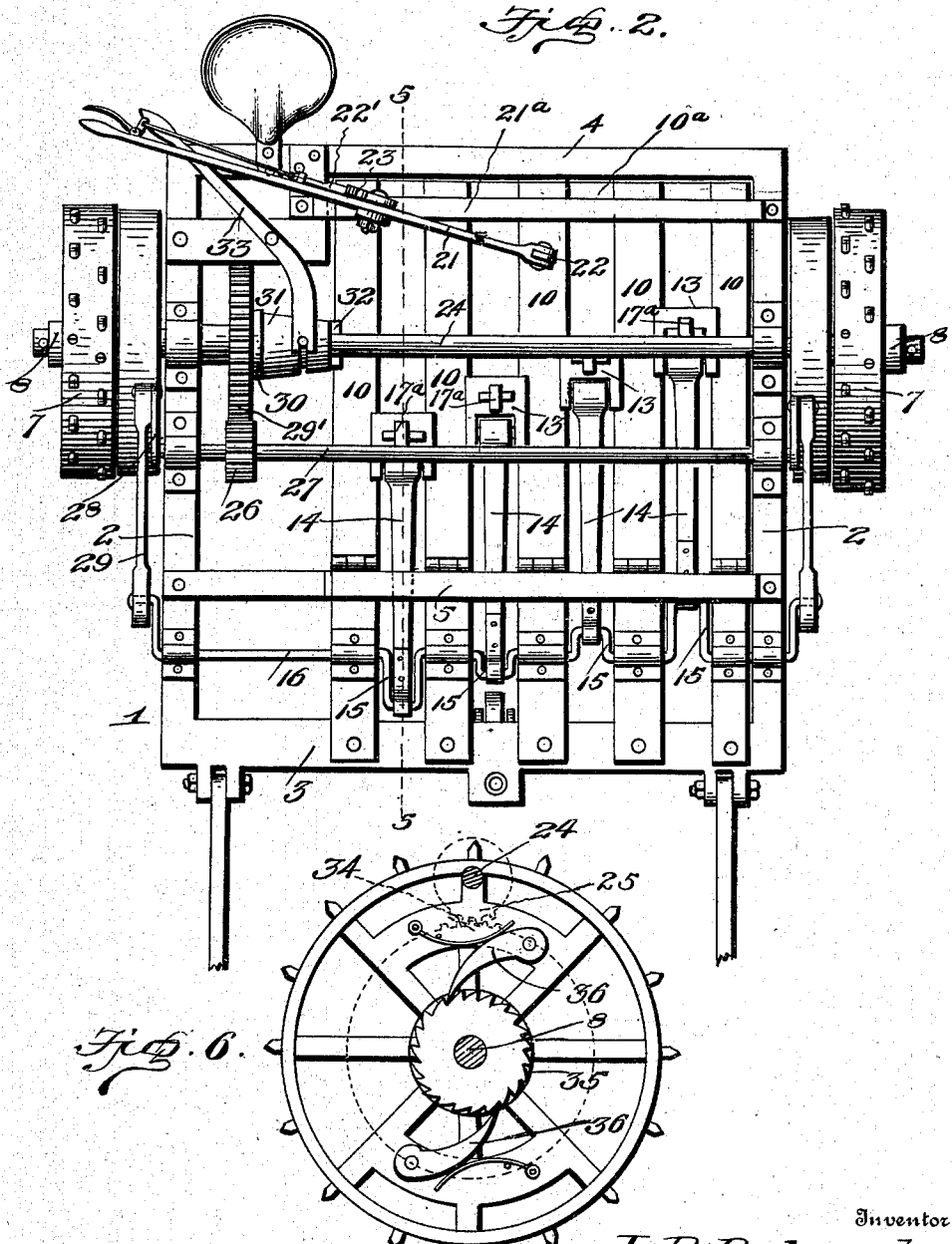

No. 681,012. Patented Aug. 20, 1901.
J. R. BABCOCK.
WHEELED PLOW OR CULTIVATOR.
(Application filed Feb. 21, 1901.)
(No Model.) 3 Sheets—Sheet 3.
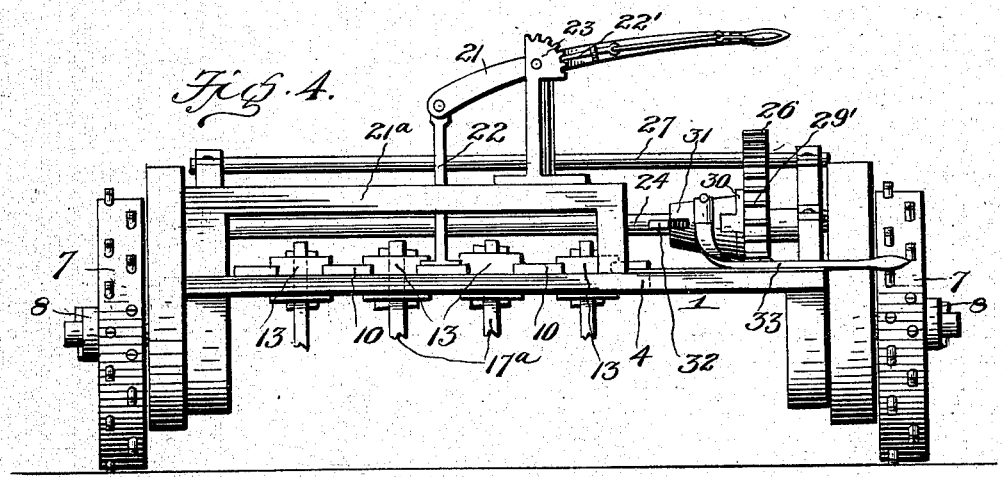
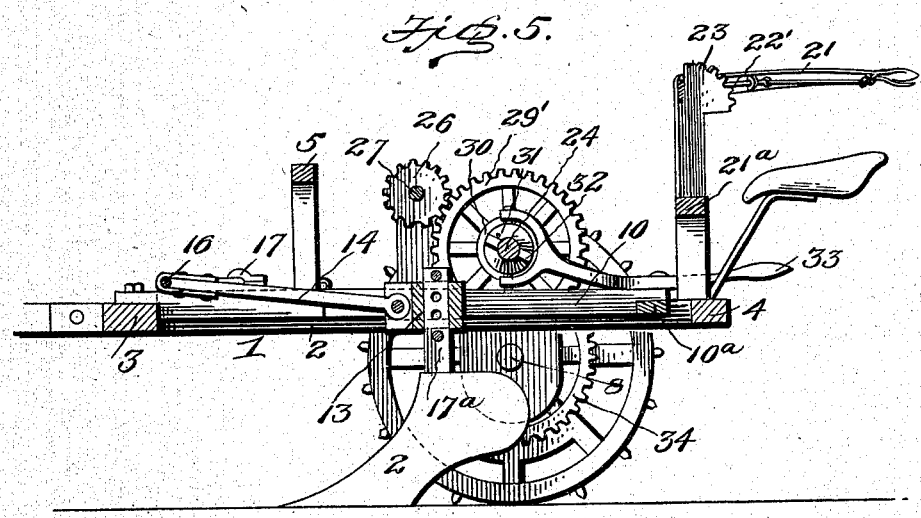
Witnesses  Inventor
J. R. Babcock
By
Attorneys

UNITED STATES PATENT OFFICE.

JAMES R. BABCOCK, OF FORT PIERRE, SOUTH DAKOTA, ASSIGNOR OF ONE-FOURTH TO TELESPHAR PARADIS, OF SAME PLACE.

WHEELED PLOW OR CULTIVATOR.

SPECIFICATION forming part of Letters Patent No. 681,012, dated August 20, 1901.

Application filed February 21, 1901. Serial No. 48,256. (No model.)

*To all whom it may concern:*

Be it known that I, JAMES R. BABCOCK, a citizen of the United States, residing at Fort Pierre, in the county of Stanley and State of South Dakota, have invented certain new and useful Improvements in Wheeled Plows or Cultivators; and I do declare the following to be a full, clear, and exact description of the invention, such as will enable others skilled in the art to which it appertains to make and use the same.

My invention relates to improvements in wheeled plows or cultivators of the gang-plow type; and its objects are to provide improved mechanism for operating the plows in rotation and also to provide means for adjusting the plows for deep or shallow plowing and to throw dirt to and from the plants.

With these and other objects in view the invention consists of certain novel features of construction, combination, and arrangements of parts, as will be hereinafter more fully described, and particularly pointed out in the appended claims.

In the accompanying drawings, Figure 1 is a side elevational view of a gang plow or cultivator embodying my invention. Fig. 2 is a top plan view of the same. Fig. 3 is a front end elevation. Fig. 4 is a rear end elevation. Fig. 5 is a vertical transverse section taken on line 5 5 of Fig. 2. Fig. 6 is a cross-section through the ratchet-hub of the drive-gears, looking toward the coöperating traction-wheel and showing the pawls or dogs engaging therewith.

Referring now more particularly to the drawings, wherein like reference-numerals designate corresponding parts throughout the several views, the numeral 1 designates the frame of the plow or cultivator, which is rectangular in form and comprises in its construction two side beams 2, a front cross-bar 3, a rear cross-bar 4, and an arched bar 5. The forward end of the frame is supported by a caster-wheel 6, mounted upon the front cross-bar 3, and to said bar draft appliances are connected in practice for the attachment of draft-animals. The rear portion of the frame is supported by traction-wheels 7, which are mounted upon stub-shafts 8, formed integrally with or fixed to pendent extensions of the side beams, and are preferably spurred or studded in the usual way to prevent slipping and to increase their hold upon the surface of the ground. Hinged at their forward ends to studs projecting from the arched bar 5 are a series of spaced parallel guide-bars 10, having their rear ends connected by a slat 10ª. Slidably mounted in these ways are a series of cross-heads 13, (four in number,) to which are attached a corresponding number of pitman-rods 14, connected at their forward ends to cranks 15, formed upon a crank-shaft 16, journaled in bearings 17, said cranks being arranged to project radially equidistant around the circumference of the shaft, so as to come into operation in turn at each quarter-revolution of the shaft. Through the said cross-heads project standards 17ª of plow-shovels 20. These standards are made vertically adjustable in said cross-heads by any suitable means—for instance, by forming the standards with a vertical row of apertures through which pins are adapted to be inserted. The plows are successively thrown or thrust forwardly through the soil by the movement of the crank-shaft in a manner readily understood. A lever 21 is pivoted to a suitably-secured cross-bar 21ª and is connected by a rod 22 with one of the guide-bars 10 and is adapted to be moved in one direction or the other to raise or depress said bar, so as to adjust the plow-shovels for deep or shallow plowing. This lever is provided with a pawl 22', adapted to engage a segment-rack 23 to hold the lever fixed in adjusted position.

The crank-shaft is operated to reciprocate the pitman-rods by means of the following mechanism: 24 represents a drive-shaft journaled in the side beams and carrying near one end a spur-gear 29', which meshes with a pinion 26 on a counter-shaft 27, which counter-shaft is provided with crank-arms 28, which are connected to the ends of the crank-shaft through the medium of connecting-rods 29, whereby power is communicated to said crank-shaft. The gear 29' is loosely mounted on the shaft 24 and is provided with a clutch-collar 30, adapted to be engaged by a sliding sleeve 31, notched to engage pins 32 on said shaft, whereby the gear may be thrown into and out of operation. A lever or shipper-bar 33 is provided to operate said sleeve 31. The drive-shaft 24 also carries at its ends pinions 25, which mesh with drive-gears 34, mounted on the stub-shafts 8 upon the inner side of the traction-wheels 7. These drive-gears are provided with ratchet-hubs 35. Spring-pressed pawls 36 are carried by the traction-wheels to engage said ratchet-hubs and rotate the gears in a forward direction to impart movement to the drive mechanism and to slip loosely over the ratchet-teeth upon the rearward movement of the traction-wheels, as when backing the plow, without operating the drive mechanism.

Having thus fully described my invention, what I claim, and desire to secure by Letters Patent, is—

1. In a gang plow or cultivator, the combination of plow-shovels, pitman-rods connected thereto, a crank-shaft for operating the pitman-rods, drive-gears having ratchets, traction-wheels carrying pawls to engage said ratchets, and gearing between the drive-gears and pitman-rods, substantially as set forth.

2. In a gang plow or cultivator, the combination of a wheel-supported frame provided with longitudinal guide-bars, a crank-shaft geared with the supporting-wheels, cross-heads mounted to slide on said guide-bars, pitmen connecting the cross-heads with the crank-shaft, and shovels having their standards connected to the cross-heads, substantially as set forth.

3. In a gang plow or cultivator, the combination of a wheel-supported frame provided with longitudinal hinged guide-bars, a crank-shaft geared with the supporting-wheels, cross-heads mounted to slide on said guide-bars, pitmen connecting the cross-heads with the crank-shaft, shovels having their standards connected to the cross-heads, and means for elevating the said hinged guide-bars, substantially as set forth.

4. In combination, a main frame and a suitably-mounted gang of plows, and means for forcing them successively forward with respect to the main frame, substantially as described.

In testimony whereof I have hereunto set my hand in presence of two subscribing witnesses.

JAMES R. BABCOCK.

Witnesses:
M. G. ZINOR,
MANUEL SYLVA.